United States Patent
Arora et al.

(10) Patent No.: US 11,444,869 B2
(45) Date of Patent: Sep. 13, 2022

(54) ENHANCED SEGMENT ROUTING

(71) Applicant: Cisco Technology, Inc., San Jose, CA (US)

(72) Inventors: Ankush Ganpatrai Arora, Mumbai (IN); Ruchir Jain, Bangalore (IN); Vinay Saini, Bangalore (IN); Atahar Khan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 241 days.

(21) Appl. No.: 16/814,981

(22) Filed: Mar. 10, 2020

(65) Prior Publication Data
US 2021/0288902 A1   Sep. 16, 2021

(51) Int. Cl.
*H04L 45/00* (2022.01)
*H04L 9/40* (2022.01)
*G06Q 50/26* (2012.01)
*G06Q 10/06* (2012.01)

(52) U.S. Cl.
CPC ......... *H04L 45/34* (2013.01); *G06Q 10/0631* (2013.01); *G06Q 50/26* (2013.01); *H04L 63/1416* (2013.01)

(58) Field of Classification Search
CPC .... G06Q 10/0631; G06Q 50/26; H04L 12/66; H04L 12/2854; H04L 12/4633; H04L 12/4641; H04L 41/0803; H04L 43/062; H04L 45/00; H04L 45/34; H04L 47/20; H04L 47/122; H04L 47/724; H04L 63/1416; H04L 63/20; H04L 67/16; H04L 67/104; H04L 67/1068; H04L 69/16; H04W 40/20; H04W 40/24; H04W 40/36
See application file for complete search history.

(56) References Cited

U.S. PATENT DOCUMENTS

| | | | |
|---|---|---|---|
| 7,269,157 | B2 | 9/2007 | Klinker |
| 7,336,613 | B2 | 2/2008 | Lloyd |
| 8,023,504 | B2 | 9/2011 | Pritam |
| 8,693,374 | B1 * | 4/2014 | Murphy ............... H04L 45/42 370/255 |
| 9,912,577 | B2 | 3/2018 | Filsfils et al. |
| 10,165,093 | B2 * | 12/2018 | Filsfils ............... H04L 41/5051 |

(Continued)

OTHER PUBLICATIONS

Cisco.com; BGP Best Path Selection Algorithm, by Cisco, Downloaded Dec. 6, 2019, 16 pages.

*Primary Examiner* — Marsha D Banks Harold
*Assistant Examiner* — Dharmesh J Patel
(74) *Attorney, Agent, or Firm* — Lee & Hayes, P.C.

(57) ABSTRACT

This disclosure describes techniques for enhanced segment routing across computer networks. The routing of data traffic may be enhanced by accounting for additional considerations, beyond typical network parameters, when selecting segment routes via which to route the data traffic. For instance, a service provider (SP) may wish to consider business priorities when selecting a segment route to another SP. The techniques described herein include mechanisms for gathering and/or receiving information regarding business priorities, analyzing the business priorities, and determining a segment route. As such, through accounting for additional considerations beyond typical network parameters, enhanced segment routing may potentially improve client service and network operations.

20 Claims, 11 Drawing Sheets

(56) References Cited

U.S. PATENT DOCUMENTS

| | | | | |
|---|---|---|---|---|
| 10,412,019 B2* | 9/2019 | Zhao | .................... | H04W 40/36 |
| 10,454,780 B2 | 10/2019 | Jeuk | | |
| 2011/0013517 A1* | 1/2011 | So | ........................ | H04L 47/724 |
| | | | | 370/238 |
| 2011/0069619 A1* | 3/2011 | Voit | ....................... | H04L 41/12 |
| | | | | 370/248 |
| 2013/0064110 A1* | 3/2013 | Polinati | .............. | H04L 41/5067 |
| | | | | 370/252 |
| 2017/0289027 A1* | 10/2017 | Ratnasingham | ........ | H04L 45/04 |

* cited by examiner

ENHANCED SEGMENT ROUTING

TECHNICAL FIELD

The present disclosure relates generally to enhanced segment routing across computer networks, thereby improving network operations and client service.

BACKGROUND

A computer network is a geographically distributed collection of nodes interconnected by communication links and segments for transporting data between nodes, such as personal computers and workstations. Many types of networks are available. For example, wide area networks (WANs) typically connect geographically dispersed nodes over long distance communications links, such as common carrier telephone lines, optical lightpaths, synchronous optical networks (SONET), or synchronous digital hierarchy (SDH) links. The Internet is an example of a WAN that connects many disparate service providers (SPs) throughout the world, providing global communication between nodes on various networks. Routing decisions across SPs are typically based on network parameters, such as a number of hops, speed of a network segment, network policies, etc. However, SPs may also have requirements to steer Internet-bound traffic through peering partners based on additional considerations, such as monetary cost of bandwidth, business priority, security threats, latency, etc. Furthermore, such business parameters may be dynamic due to ever-changing relationships between SPs. Inefficient, manual intervention has typically been needed to address business parameters, and to detect and/or respond to changes in business parameters. Automation of segment routing that is capable of accounting for a broader set of considerations is needed to improve network operations and client service.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
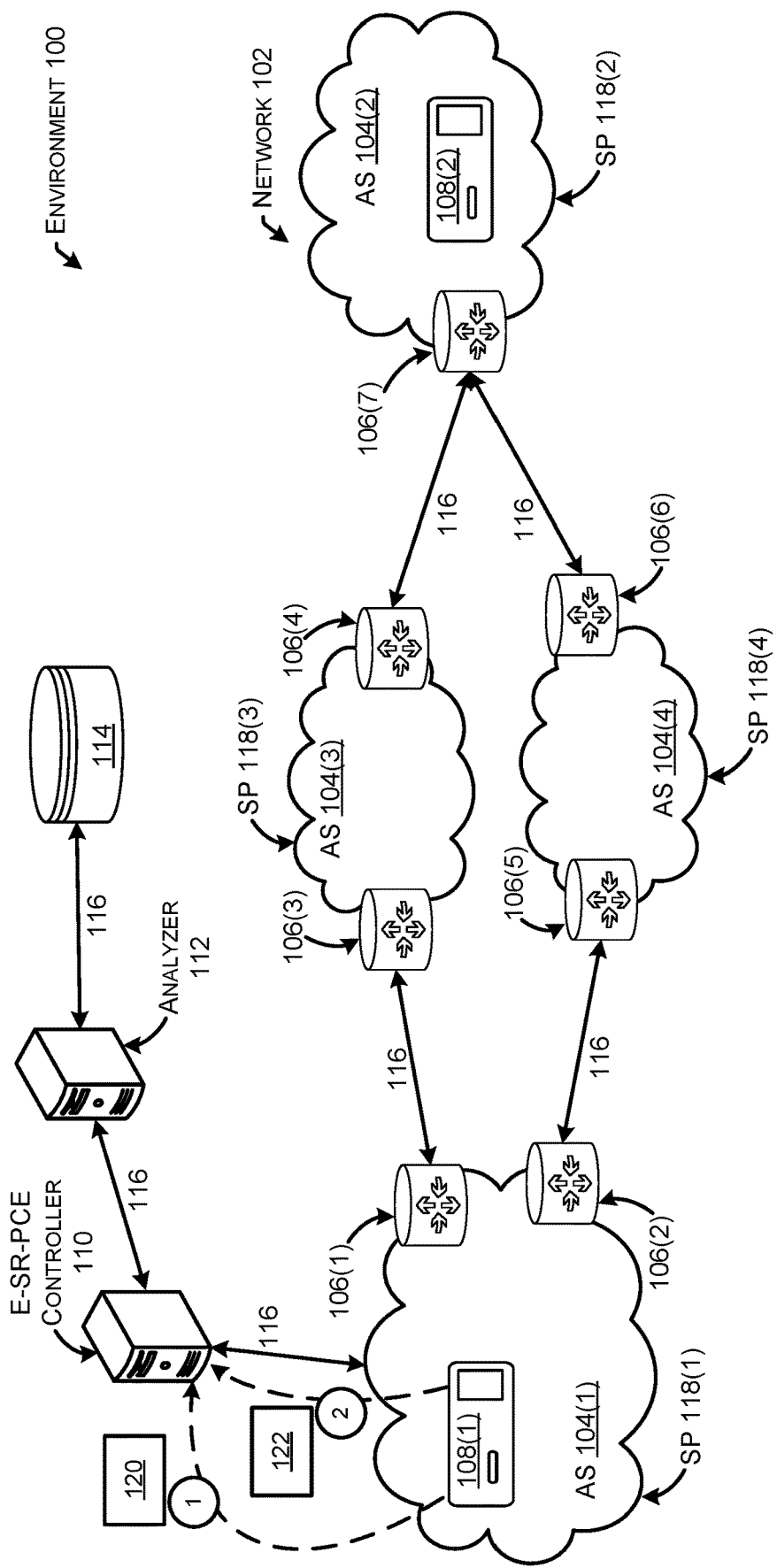
FIGS. 1A-1F illustrate component diagrams with an example environment in which enhanced segment routing techniques may be employed as part of communications between network devices, in accordance with the present concepts.

This disclosure describes a method that may be implemented by a controller device communicatively coupled to source computing device and/or one or more border router devices. The method may include receiving, at the controller device in a local autonomous system (AS) associated with a local service provider (SP), a request from the source computing device in the local AS to configure a segment route to communicate data traffic from the source computing device to a destination SP that is remote from the local AS. The method may further include receiving a first address family identifier (AFI) indicating a first business priority associated with communicating the data traffic through a first intermediary AS associated with a first intermediary SP, and receiving a second address family identifier (AFI) indicating a second business priority associated with communicating the data traffic through a second intermediary AS associated with a second intermediary SP. The method may include determining, based at least in part on the first business priority and the second business priority, to configure the segment route through the second intermediary AS rather than through the first intermediary AS. The method may also include configuring the segment route between the source computing device and the destination SP such that at least a portion of the segment route passes through the second intermediary AS. In some cases, the method may include instructing the source computing device to route the data traffic via the configured segment route.

In another example, the method may include receiving a request from a source computing device of the local SP to configure a segment route to communicate data traffic from the source computing device to a destination SP that is remote from the source computing device. The method may include receiving, from a first autonomous system (AS) positioned between the local SP and the destination SP, a first address family identifier (AFI) conveying a first business priority associated with a first segment route for routing the data traffic from the local SP through the first AS to the destination SP. The method may also include receiving, from a second AS positioned between the local SP and the destination SP, a second AFI conveying a second business priority associated with a second segment route for routing the data traffic from the local SP through the second AS to the destination SP. Further, the method may include receiving, from the source computing device, a third business priority related to routing the data traffic from the source computing device to the destination SP. The method may include determining, based at least in part on the first business priority, the second business priority, and the third business priority, to configure the segment route through the second AS rather than through the first AS. Also, the method may include configuring the segment route between the source computing device and the destination SP such that at least a portion of the segment route passes through the second AS, and instructing the source computing device to route the data traffic via the configured segment route.

In another example, the method may include receiving a request for configuring a segment route related to routing data traffic from the local computing device, through one or more border routers of the local SP, to a remote SP. The method may include receiving, from a first autonomous system (AS) positioned between the local SP and the remote SP, a first business priority associated with a first segment route that passes through the first AS. The method may also include receiving, from a second AS positioned between the local SP and the remote SP, a second business priority associated with a second segment route that passes through the second AS. Further, the method may include receiving, from the local computing device, a third business priority related to routing the data traffic from the computing device to the second service provider. The method may include determining, based at least in part on the first business priority, the second business priority, and the third business priority, to configure the segment route through a selected border router of the one or more border routers, the selected border router representing an exit point from the local SP to the second AS. Finally, the method may include instructing the source computing device to route the data traffic to the selected border router.

Additionally, the techniques described herein may be performed by a system and/or device having non-transitory computer-readable media storing computer-executable instructions that, when executed by one or more processors, performs one or more of the methods described above.

Example Embodiments

This disclosure describes techniques for enhanced segment routing across computer networks. The routing of data traffic may be enhanced by accounting for additional considerations, beyond typical network parameters, when selecting segments and/or autonomous systems (ASs) via which to route the data traffic. The additional considerations for enhanced segment routing are broadly termed "business priorities" herein. For instance, a business priority might be minimizing a monetary cost of transferring the data traffic, ensuring a higher security level for the data traffic, etc. In some examples, a service provider (SP) may wish to send data traffic to another, relatively distant SP. The techniques described herein include gathering and/or receiving information regarding business priorities from the sending SP, from other SPs, and/or from other databases or repositories of information. The enhanced segment routing techniques also include analyzing the business priorities in order to determine segment routes. As such, through accounting for additional considerations beyond typical network parameters, enhanced segment routing may improve client service and potentially improve network operations.

In this case, a "network" generally refers to a wide area network (WAN), such as the Internet or a public cloud network, for example, which may be viewed as an interconnected system of service providers (SPs). For instance, envision a telecommunications SP in India, which may pass data traffic through a second SP in Singapore on its way to a third SP in the United States. Further, any particular SP may maintain relatively smaller, more manageable groups of nodes (e.g., devices) as autonomous systems (ASs) (e.g., routing domains, etc.). The ASs may be coupled together (e.g., peered) by boundary routers (e.g., ASBRs, edge devices). In order to improve routing scalability and/or capacity for any given network, it may be desirable to increase the number of nodes capable of exchanging data. Therefore, an AS may have multiple ASBRs, and/or multiple segments within the AS, that may each provide a valid path through various nodes to the same destination(s). Individual ASBRs may also have multiple valid paths to the same destination(s), such as where a single ASBR connects to multiple other ASBRs, and/or has multiple connections to a same adjacent ASBR. In some cases, segment routing, egress peer engineering (SR-EPE) may be used to determine one or more paths for any particular flow of data traffic.

ASBR couplings may include a data-plane interconnection link (NNI) and/or a control-plane link. A control-plane link between ASs may use any suitable protocol for communication. An example communication protocol is border gateway protocol (BGP). Thus, in some cases coupled ASBRs may be referred to as BGP peers (or external BGP (EBGP) peers). As such, routing of data traffic across ASs may be controlled by BGP metrics and policies between the ASBRs (e.g., EBGP peers) of different ASs. In order to establish an EBGP peer link for communication, ASBRs may exchange information, such as topology information for the network, other routing and/or reachability information for the network, and/or other network parameters. In some examples, the network information may be exchanged via BGP using an address family identifier (AFI) and/or a subsequent address family identifier (SAFI). In some examples, BGP AFI/SAFI may be provided for individual prefixes (per prefix) in the AS.

In some cases, a controller (e.g., controller device, software defined networking (SDN) controller) may be employed to perform SR egress peer engineering (SR-EPE), to select a route across the network for data traffic. In some examples, the controller may be a segment routing, path computation element (SR-PCE) controller. The SR-PCE controller may be manifest as a router or a server, for example, or may be a virtualized entity. When a source device seeks a path for data traffic, the device may send a request to the SR-PCE. The SR-PCE may have access to topology information for the network, such as the information exchanged in the BGP AFI/SAFI (or other protocol) communications described above. Therefore the SR-PCE may have knowledge of the network topology, which may include multiple ASs (and potentially the entire network), and can use the topology information in path computations. Routing decisions by the SR-PCE controller may typically be based on network parameters such as a number of hops, speed of a network path, network policies, etc. In some examples, BGP protocol and/or SR-EPE may handle multiple AS egress options (e.g., multiple ASBRs connecting to a peer AS) by using "best path selection" techniques to choose one or more particular egress routes.

Enhanced segment routing techniques may include consideration of additional information in choosing a path for data traffic across the network. For instance, with enhanced segment routing, the additional input of business priorities may be used as part of the path selection criteria. In some implementations, an "enhanced" SR-PCE may be capable of considering business priorities and network parameters together to make a path selection that better fits the data transfer needs of a client. The enhanced SR-PCE may receive business priority information (e.g., data, values) from a variety of sources. In some examples, an enhanced BGP AFI/SAFI and/or other communication may be used to convey business priority information. For instance, the enhanced BGP AFI/SAFI may feature extensions dedicated to business priority information, may be expanded with extra data fields, and/or may be otherwise improved. The business priority information in the enhanced BGP AFI/SAFI may include a relative bandwidth carrying monetary cost for a particular segment and/or performance parameters such as latency, link utilization, and/or a reliability factor. In another example, the enhanced SR-PCE may receive business priority information from a local peer, such as a source device associated with an AS that is local to the enhanced SR-PCE, or a service provider that is relatively local to the enhanced SR-PCE, for instance. In still other examples, the enhanced SR-PCE may receive other types of business priority information from other sources, such as security threat information (e.g., information regarding ASs that are to be avoided due to security issues), government regulation information pertinent to data traffic, etc.

In the case of business priority information received from a local peer, the business priority information may include a variety of priorities, stipulations, and/or other reasons to choose one AS or segment route over another. The business priorities may be specific to the SP that intends to send the data traffic, such as business priorities that are derived from the very nature of the industry of the SP, or aspects of the relationship(s) SPs have with one another. Examples of such business priorities may include legal considerations, cost limitations, security considerations, regulatory considerations, maintenance schedules, link utilization, a load sharing ratio, etc. Consider for instance a bank client that intends to make a data transfer of sensitive information may have a higher security consideration than another entity transferring less sensitive information. In this case, business priority information relevant to data transfer for a bank may include stipulations to avoid an SP that is known to have had a security breach, for example. Today, routing around SPs with questionable security is generally performed manually after detecting a security threat. In contrast, the bank client may prefer automation that could take inputs from threat analytics and configure traffic steering policies accordingly.

An important potential benefit of enhanced segment routing comes from the dynamic nature of many business priorities. Relationships between SPs, link utilization, latency, represent just a few examples of business priorities that may change repeatedly and/or constantly. Also, a monetary cost of data traffic may be based on an overall state of business of a particular SP, complicating segment routing optimization. Typically, networks require manual intervention to detect these changing values related to business priorities. Networks may also require manual intervention to change a related BGP (or other protocol) policy or metric, such as through a network provisioning system. Manual intervention is inefficient; automation to address changing conditions in segment routing may be preferred by SPs. However, existing controllers or orchestration systems may lack a mechanism to receive the new business priority inputs, and/or may lack the intelligence to dynamically change associated protocol configurations based on changing conditions. Therefore, enhanced segment routing techniques, including an enhanced SR-PCE controller, may provide significant improvements in efficiency of segment routing. In order to better serve clients in a timely manner, the enhanced SR-PCE controller may improve on traditional SR-EPE calculations with additional algorithms, machine learning, or other types of analysis to efficiently incorporate business priorities into segment routing decisions. Enhanced segment routing may even be able to predict better segment routing options for a client for the future, based on analysis of historical information and current trends.

To summarize, incorporation of business priorities into decision making for segment routing purposes provides a new category of information with which to make better-informed, yet dynamic and automated, segment routing decisions. Clients are better-served with attention to priorities that are specific to the nature of their own businesses, and/or their particular relationships with SPs. An enhanced SR-PCE is capable of automatically handling ever-changing criteria by updating business priority information without needing to wait for a manual information lookup or a manual policy change to be implemented. Such streamlining may potentially improve the overall efficiency of network operations. Therefore, through features such as improved decision-making with expanded inputs, automatic updating, better-served clients, and more efficient network operations, enhanced segment routing techniques allow for "smart" segment routing as compared to traditional techniques.

Although the examples described herein may refer to SR-PCE controllers, ASBRs, devices using BGP, and/or source or destination nodes, the techniques can generally be applied to any device in a network and/or other suitable protocols. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1F collectively illustrate an example environment 100 in accordance with the present enhanced segment routing concepts. Example environment 100 may include a network 102 (e.g., Internet, public cloud). As shown in FIGS. 1A-1F, the network 102 may be composed of several autonomous systems (ASs) 104. The ASs 104 may include border routers (BRs) 106 (e.g., ASBRs) and/or a variety of other devices, such as computing devices 108. The environment 100 may also include an enhanced segment routing, path computation element (SR-PCE) controller 110 (e.g., controller device), an analyzer 112 (analytics engine), and/or a database 114. Although enhanced SR-PCE controller 110 and analyzer 112 are shown outside of AS 104(1) due to limitations of the drawing page in FIGS. 1A-1F, enhanced SR-PCE controller 110 and/or analyzer 112 may be viewed as part of AS 104(1). Stated another way, in some cases enhanced SR-PCE controller 110 and analyzer 112 may be considered local to computing device 108(1). In some cases database 114 may be part of AS 104(1), in other cases database 114 may be an external information source.

As shown in FIGS. 1A-1F, ASs 104 may be communicatively coupled via network connections 116 (indicated as double arrows) between the BRs 106. Additionally, computing devices 108, enhanced SR-PCE controller 110, analyzer 112, and/or database 114 may exchange communications (e.g., packets) via network connections 116. For instance, network connections 116 may be transport control protocol (TCP) network connections or any network connection (e.g., information-centric networking (ICN)) that enables the devices of the ASs 104 to exchange packets with other devices via network 102. The network connections 116 represent, for example, data paths between devices of the ASs 104. It should be appreciated that the term "network connection" may also be referred to as a "network path." Note that there may be communicatively couplings between nodes within ASs 104, such as between computing device 108(1) and BR 106(1). Also, there may be multiple nodes between devices shown in FIGS. 1A-1F, such as between BR 106(3) and BR 106(4). However, couplings and additional nodes within the ASs are not shown to avoid clutter on the drawing page. In the case of network connections 116 between BRs 106, the connections may represent data-plane interconnection links (NNI) and/or control-plane links that support border gateway protocol (BGP) and/or another suitable protocol for communication. For instance, BR 106(1) and BR 106(3) may be considered BGP peers in this example.

In some implementations, any of the ASs 104 depicted in FIGS. 1A-1F may be associated with service providers (SPs) 118. For instance, AS 104(1) may be associated with an SP 118(1). In this case, computing device 108(1) may be viewed as a source device running a cloud application, and may be providing content to computing device 108(2), which may be viewed as a destination device (e.g., client device, user device) residing within AS 104(2). AS 104(2) may be associated with SP 118(2). Virtually any number of other ASs 104 (and associated SPs 118) may be located between AS 104(1) and AS 104(2). For purposes of illustration, envision that AS 104(1) is associated with SP 118(1) located in India, and AS 104(2) is associated with SP 118(2) located in Germany. Data traffic may pass through one or more intermediary ASs 104 to be routed from India to Germany, such as AS 104(3), which may be physically located in Turkey, and may be associated with SP 118(3). Further, many other potential paths through various ASs 104 are contemplated, such as through AS 104(4), or a path that runs from AS 104(1) to AS 104(3), then through AS 104(4) before arriving at AS 104(2), for example. In some cases, multiple ASs 104 may be associated with a single SP 118. The number and arrangement of ASs 104 and/or SPs 118 in FIGS. 1A-1F are not meant to be limiting. Similarly, the use of ASs 104 and/or SPs 118 in the example network 102 is not meant to be limiting. Other groupings, subsets, and/or components of networks are contemplated in accordance with enhanced segment routing concepts.

FIGS. 1A-1D show several examples of communications (indicated with dashed, numbered lines) between computing device 108(1), BRs 106, enhanced SR-PCE controller 110, analyzer 112, and database 114. The communications may be viewed as part of an enhanced segment routing scenario. For example, referring to FIG. 1A, at "Step 1," computing device 108(1) may send a request 120 to enhanced SR-PCE controller 110. The request 120 may be sent directly from computing device 108(1) to enhanced SR-PCE controller 110, or the request 120 may be routed through another device, such as BR 106(1). Request 120 may be a request for a segment route from computing device 108(1) to AS 104(2) or to SP 118(2). For instance, computing device 108(1) may be a source device (e.g., server) that wishes to send data traffic to AS 104(2) or SP 118(2). The data traffic may ultimately be intended for computing device 108(2), for instance. However, computing device 108(1) may not have knowledge of the specific destination endpoint device, and/or may not know an appropriate route to reach computing device 108(2), AS 104(2), or SP 118(2). Therefore, server device 108 sends request 120 to enhanced SR-PCE controller 110 to learn an appropriate segment route. Stated another way, the request 120 may be a request for the enhanced SR-PCE controller 110 to configure an appropriate segment route from the computing device 108(1) to the destination, or remote SP 118(2).

At "Step 2," computing device 108(1) may send business priority information 122 (e.g., a business priority) to enhanced SR-PCE controller 110. Similar to request 118, business priority information 122 may be sent directly from computing device 108(1) to enhanced SR-PCE controller 110, or may be routed through another device, such as BR 106(1). Business priority information 122 may be sent before, after, or concurrently with request 120. For example, business priority information 122 may be associated with a service level agreement (SLA) for an application running on computing device 108(1). As such, business priority information 122 may be sent to enhanced SR-PCE controller 110 as part of an initiation of service relating to the application, before any specific request 120 relating to data traffic is made. In another example, business priority information 122 may be sent concurrently with the request 120. For instance, business priority information 122 sent concurrently with any given request 120 may help provide up-to-date information for segment routing of data traffic at a particular point in time, as conditions of the network 102 or relationships between SPs change. Additionally or alternatively, business priority information 122 may be sent repeatedly from computing device 108(1) to enhanced SR-PCE controller 110 to keep pace with changing conditions and/or relationships.

A variety of content is contemplated for business priority information 122. As suggested above, business priority information 122 may include business priorities such as legal considerations, cost limitations, security considerations, regulatory considerations, maintenance schedules and/or bulletins, link utilization, a load sharing ratio, etc. Business priority information 122 may be locally configured as relevant to computing device 108(1), to an application running on computing device 108(1), to AS 104(1), and/or to SP 118(1). An example includes a business priority and/or preference to route traffic through a particular peer AS 104 and/or upstream SP 118. For instance, SP 118(1) (or an application running on computing device 108(1), etc.) may prefer to transfer data with SP 118(4) over SP 118(3) due to a business reason, such as a relationship with SP 118(4). Another example includes a security and/or regulatory factor. For instance, SP 118(1) may prefer to transfer data with SP 118(4) over SP 118(3) due to regulatory or security reasons. In another example, SP 118(1) may have a policy to avoid ASs 104 which have nodes that are undergoing maintenance, to avoid potential delays in data transfer. In yet another example, SP 118(1) may simply prefer to utilize links to a particular peer SP 118 and/or a particular upstream provider SP 118. In this example, the links could be monitored for historic and/or real-time interface utilization. Still another example of business priority information 122 includes load sharing preferences. For instance, an application running on computing device 108(1) and/or SP 118(1) may prefer to split data traffic between SPs 118 (and/or ASs 104) in a certain ratio. Various algorithms are considered for how to determine the ratio. In some cases, IPFIX could be used to identify the data transfer flows and bandwidths they consume. Once information is available on which flows consume what percentage of the bandwidth, the data traffic could be split between multiple links and/or sent to different peer and/or upstream SPs based on the determined ratio. The BGP metrics could be configured appropriately along with a prefix-list for different routes associated with different flows detected using IPFIX. Finally, any of these examples of business priority information 122 could be a weighted factor in enhanced segment routing.

Figure 1B:
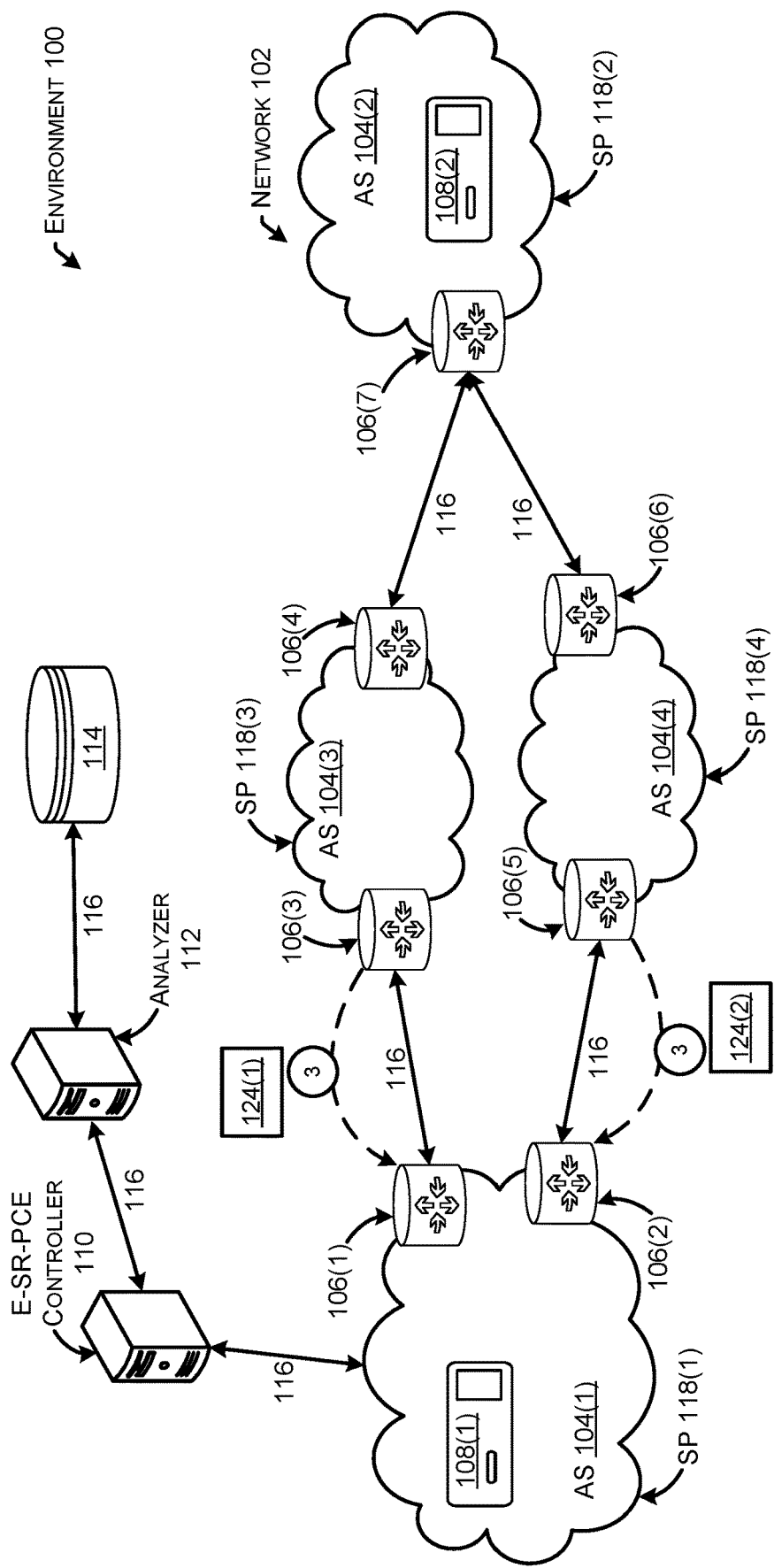

FIG. 1B shows further examples of communications among the devices of network 102. At "Step 3," BR 106(3) may send business priority information 124(1) to BR 106(1). Also at "Step 3," BR 106(5) may send business priority information 124(2) to BR 106(2). In some implementations, business priority information 124(1) and/or business priority information 124(2) may be manifest as an enhanced BGP AFI/SAFI. In enhanced segment routing, the enhanced BGP AFI/SAFI may include fields for carrying relevant business priority data or values of the AS 104, in addition to traditionally provided network parameters or other information. For instance, fields in the enhanced BGP AFI/SAFI of business priority information 124(1) may carry values related to a bandwidth carrying monetary cost (e.g., cost per gigabyte (GB)) to carry data traffic through AS 104(3), and/or performance parameters of AS 104(3), such as bandwidth availability, latency, reliability, etc. The enhanced BGP AFI/SAFI may be provided for every BGP prefix that is exchanged. Also, note that the business priority information 124(1) and/or business priority information 124(2) may be sent before, after, and/or concurrent with either of Step 1 and/or Step 2 shown in FIG. 1A.

In the case of the enhanced BGP AFI/SAFI carrying data related to a bandwidth carrying monetary cost, the data may be expressed as an actual cost (e.g., per GB) and/or may be expressed as a cost factor. For instance, rather than attempting to account for different currencies in regions of different ASs 104, or varying exchange rates, the bandwidth carrying monetary cost may be expressed as a cost factor relative to some base price. For instance, a cost factor may be assigned to an autonomous system number (ASN) identifying the AS 104. In a case where an SP 118 is less utilized, the cost factor may be decreased: example×0.5. In another case where an SP 118 is highly utilized, the cost factor may be increased: example×1.5. A wide variety of reasons for costs to differ among ASs 104 and/or SPs 118 are contemplated, including cost of housing equipment in the geographic area of the AS, cost of power, subsidized costs, etc. Referring to FIG. 1B, business priority information 124(1) may convey a cost factor of ×1.5, while business priority information 124(2) conveys a cost factor of ×0.5. In instances where multiple ASs 104 are traversed to reach a particular destination prefix and/or SP 118, the bandwidth carrying monetary cost values may be added to give a cumulative cost. For instance, the BR 106 supplying the enhanced BGP AFI/SAFI may add the bandwidth carrying monetary cost values of multiple ASs 104 to arrive at the cumulative cost.

Also included in the enhanced BGP AFI/SAFI may be data or values related to latency. For instance, business priority information 124(1) may convey a latency value of 0.1 milliseconds (ms), while business priority information 124(2) conveys a latency value of 0.2 ms. In some examples, latency may also be expressed in the enhanced BGP AFI/SAFI as a latency factor (and/or as an adjustment to the cost factor). Also, in the case of the enhanced BGP AFI/SAFI carrying data related to latency through multiple ASs 104, a cumulative latency and/or cumulative latency factor may also be provided. Similar to cost or latency, the enhanced BGP AFI/SAFI of business priority information 124(1) may carry values related to reliability, or reliability information expressed as a reliability factor. For instance, where there is a planned maintenance or known outage in an AS, the reliability factor may be decreased. For illustrations purposes, the reliability factor conveyed by business priority information 124(1) for AS 104(3) may be ×0.4 suggesting relatively poor reliability, while a reliability factor conveyed by business priority information 124(2) for AS 104(4) may be ×0.9, suggesting better reliability than AS 104(3). In some cases, early congestion notification (ECN) may be leveraged to determine this factor.

Figure 1C:
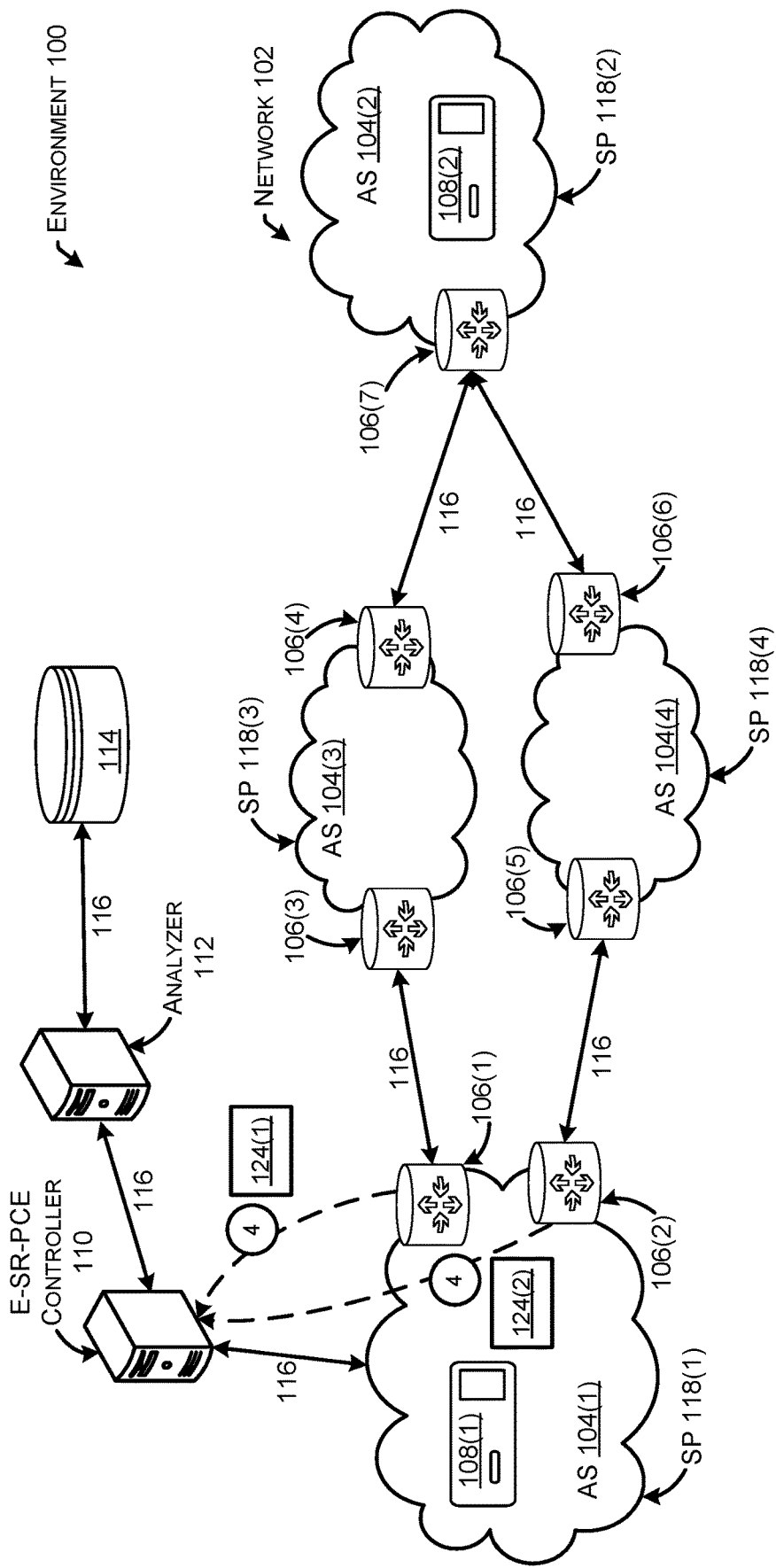

As illustrated in FIG. 1C, at "Step 4," BR 106(1) may forward the business priority information 124(1) to the enhanced SR-PCE controller 110. Also at "Step 4," BR 106(2) may forward the business priority information 124(2) to the enhanced SR-PCE controller 110. Stated another way, learned business priority information 124 from peer ASs 104 may be passed on from any BR 106 of AS 104(1) to enhanced SR-PCE controller 110. As such, through the example communications illustrated in FIGS. 1A-1C, the enhanced SR-PCE controller 110 may have collected various business priority information 122 and/or business priority information 124. Therefore, enhanced SR-PCE controller 110 may be better able to respond to requests 120 for segment routes from any particular computing device 108 within AS 104(1) or from any other entity associated with SP 118(1), for example. In some cases, enhanced SR-PCE controller 110 may be capable of performing enhanced segment routing techniques using the collected business priority information. In other cases, the enhanced SR-PCE controller 110 may outsource some or all of the analysis of the collected business priority information, as described below.

Figure 1D:
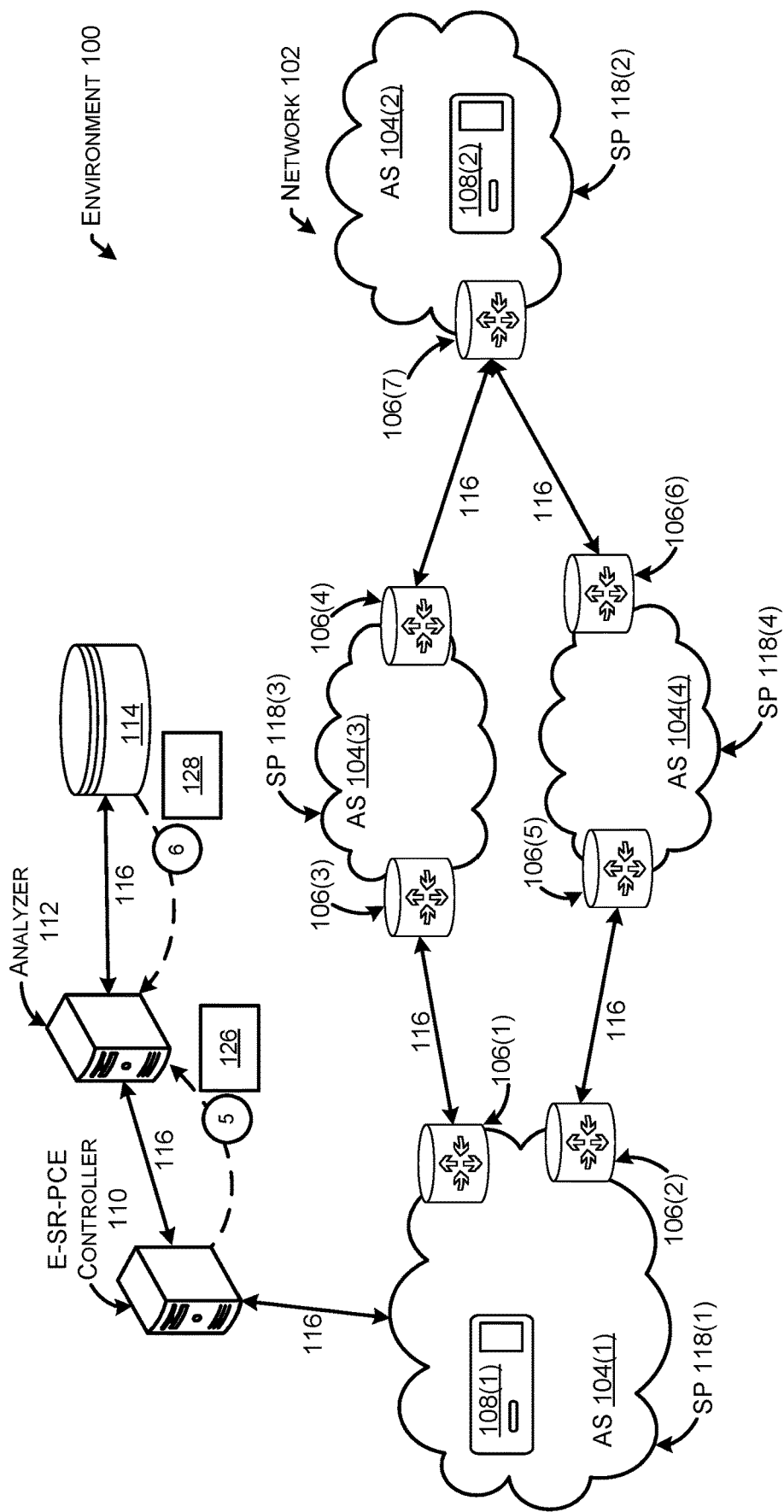

FIG. 1D shows further example communications which may be part of an enhanced segment routing scenario. At "Step 5," enhanced SR-PCE controller 110 may send some or all of the collected business priority information 126 to analyzer 112 (e.g., analytics engine). Analyzer 112 may reside on a separate computing device as suggested in FIG. 1D, or may be included on a common computing device with enhanced SR-PCE controller 110 in other examples. In addition to the collected business priority information 126, at "Step 6," analyzer 112 may receive further business priority information 128 from database 114. For instance, database 114 may be a cloud security database that keeps threat intelligence information regarding ASs 104 and/or SPs 118. As such, the further business priority information 128 may include threat intelligence data, including information regarding which prefixes or ASNs that must be avoided due to security considerations based on past security incidents. In further examples, database 114 may represent a government regulatory site that provides information on current regulations affecting data traffic between different geopolitical entities. For instance, a first country in which an AS 104 is physically located may ban data traffic to and/or from any SPs 118 and/or ASs 104 in a second country. In this instance, the further business priority information 128 may reflect a stipulation to use an AS 104 not located in the second country. Therefore, the further business priority information 128 may serve as further input to the analyzer 112 to select the most appropriate segment route.

Analyzer 112 may use a variety of methods to determine a segment route and/or an exit point from the sending AS 104. An algorithm may be used that mixes performance, cost, and/or other business priority information to select an appropriate, and potential the best segment route. The methods may include weighting and/or ranking some business priority information over other business priority information. For example, in a comparison of possible segment routes through multiple available ASs 104, bandwidth carrying monetary cost may be assigned a greater weight than security level. In this example, the sending computing device 108 (or application running on the computing device 108) may have stipulated in business priority information 122 that it prefers cheaper segment routes and is less concerned about security of the data traffic, for instance. Specific weights and/or a rankings for the business priorities may also be included in the business priority information 122, 124, 126, and/or 128. In another example, analysis may begin with inflexible stipulations to narrow a list of potential segment routes, such as a government regulation included in further business priority information 128 that disallows selection of a segment route through a particular AS 104. In still other examples, some rankings of business priorities may be included as defaults to use in the absence of a specified ranking. For instance, an algorithm for determination of a segment route and/or an exit point may default to ranking bandwidth carrying monetary cost over a security level concern in the absence of instructions or business priority information to the contrary from a client or SP 118. In some cases, the segment route determination may be repeated and/or updated as new information becomes available.

Recall that in reference to FIG. 1B (above), example values for cost and latency were provided for business priority information 124(1) and business priority information 124(2). The cost factor conveyed by example business priority information 124(1) was ×1.5, while the cost factor conveyed by business priority information 124(2) was ×0.5. Also, the latency value conveyed by business priority information 124(1) was 0.1 ms, while the latency value conveyed by business priority information 124(2) was 0.2 ms. Furthermore, business priority information 122 may have suggested that cost should be assigned a greater weight than latency when selecting a segment route. In this example, analyzer 112 may determine, based on business priority information 122, business priority information 124(1), and business priority information 124(2), to configure a segment route through AS 104(4) for data traffic to be routed from computing device 108(1) to remote SP 118(2). Additionally or alternatively, analyzer 112 may determine, based on business priority information 122, business priority information 124(1), and business priority information 124(2), to configure a segment route exiting AS 104(1) via BR 106(2) as the exit point for data traffic to be routed from computing device 108(1) to remote SP 118(2). Furthermore, the reliability factors or any other business priority conveyed by business priority information 122, business priority information 124(1), business priority information 124(2), and/or business priority information 128 may also be considered in selecting a segment route and/or exit point. In these examples, analyzer 112 has incorporated consideration of business priorities pertinent to computing device 108(1) and/or to SP 118(1) into the decision of an appropriate segment route, in accordance with enhanced segment routing techniques.

In some implementations, the methods to determine a segment route may include machine learning, including prediction based on historical information. For instance, the analyzer 112 may access data that shows times of day that certain ASs 104 have experienced lighter utilization and/or offered a lower cost factor. In this instance, the analyzer 112 may use the data to train a model for predicting times of day to route data traffic through particular ASs 104 and/or times of day to avoid certain ASs 104. A wide variety of types and/or categories of business priority information are contemplated for data to feed machine learning models to assist in segment route analysis and/or prediction. The methods to determine a segment route may further include Time-Series based prediction and/or Random Neural Networks based Algorithms to predict various business priority information, such as performance parameters, cost parameters, security threats, etc. associated with different ASs 104.

Figure 1E:
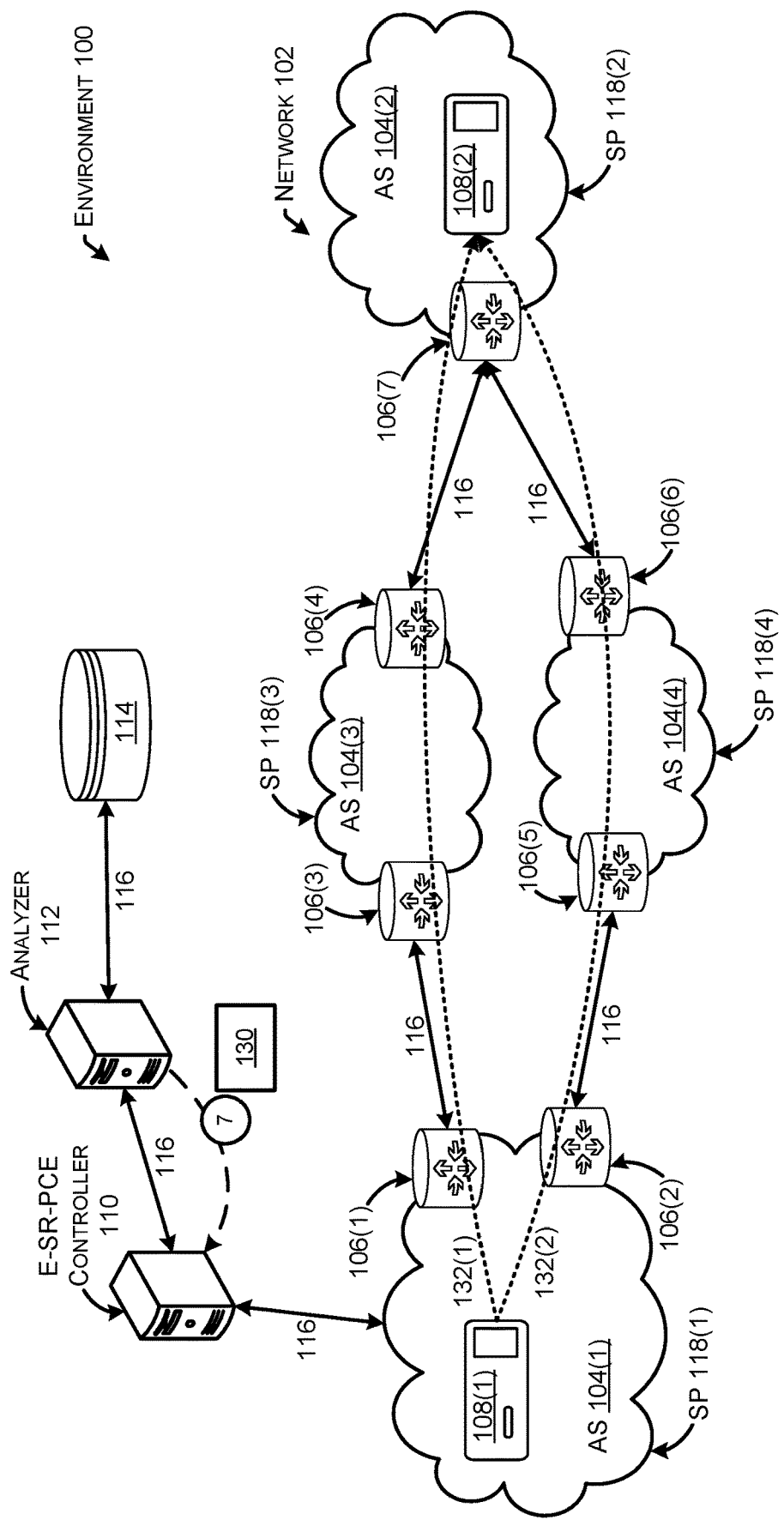

FIG. 1E shows analyzer 112 providing a segment route result 130 to enhanced SR-PCE controller 110 at "Step 7." The segment route result 130 may include one or more potential segment routes 132 (indicated as dotted lines in FIG. 1E) for sending data traffic to the destination SP 118(2) and/or computing device 108(2). For instance, in potential segment route 132(1) the exit point from AS 104(1) may be BR 106(1), routing data traffic through AS 104(3) to AS 104(2). Meanwhile, in potential segment route 132(2) the exit point from AS 104(1) may be BR 106(2), routing data traffic through AS 104(4) to AS 104(2). Any potential segment route 132 may simply include specification of an exit point(s) from the local domain towards the destination SP 118, may further include identification of ASs s) 104 through which to route the data traffic, and/or may also include specification of some or potentially all of the individual segments between nodes along the segment route 132 from the sending computing device 108(1) to the destination SP 118(2) and/or the destination computing device 108(2). The segment route result 130 may include a single preferred, selected, and/or highest priority segment route 132, or may include multiple segment routes 132. For instance, the segment route result 130 may be a ranked list of segment routes 132. In further examples, the segment route result 130 may include a timing factor. For instance, segment routes 132 may be accompanied by a timing factor, expressing that a first segment route is preferred at a first time, while a second segment route may be preferred at a second time. Also, the segment route result 130 may be resent to the enhanced SR-PCE controller 110 based on updated information and/or analysis.

In a case where the segment route result 130 includes multiple segment routes 132, the enhanced SR-PCE controller 110 may make the selection of a particular segment route 132 for routing the data traffic. In some examples, the enhanced SR-PCE controller 110 may receive a specification of an exit point(s) from the local domain towards the destination SP 118 from the analyzer 112, and the enhanced SR-PCE controller 110 may determine further aspects of the segment route 132 from the exit point. For instance, the enhanced SR-PCE controller 110 may perform segment routing based on SR-EPE to steer the data traffic to the destination SP 118. Note that in some cases, the enhanced SR-PCE controller 110 may be performing both the analysis of the various business priority information (e.g., 122, 124, 126, and/or 128), selection of an exit point from the sending AS 104(1), and the segment route determination, rather than a separate analyzer 112 performing one or more aspects of the segment route determination. Stated another way, the enhanced SR-PCE controller 110 may be capable of performing evolved SR-EPE to steer data traffic to a destination SP 118, including novel consideration of business priorities that may be pertinent to an application running on a sending computing device 108 and/or SP 118.

Figure 1F:
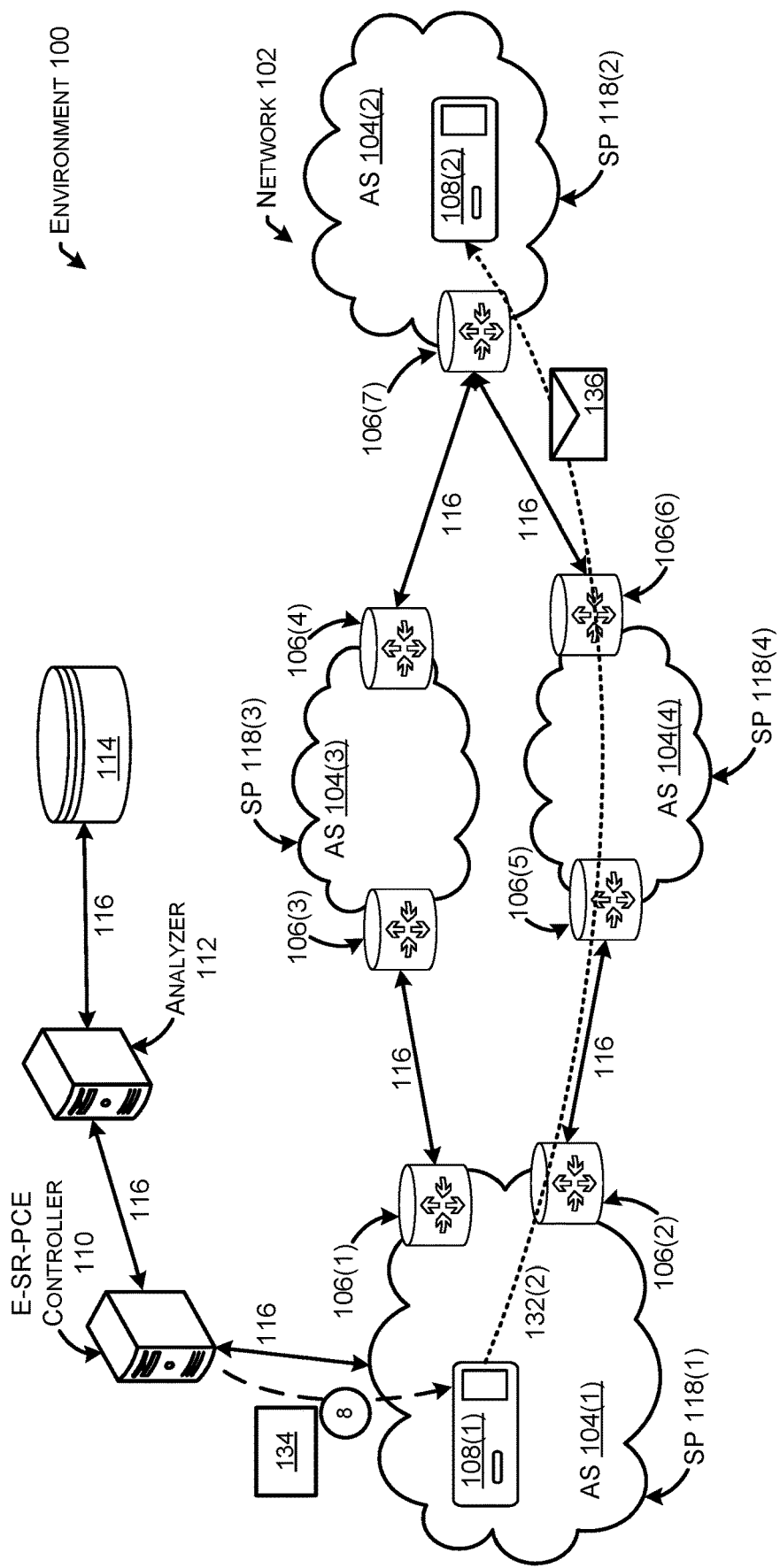

At "Step 8," as shown in FIG. 1F, enhanced SR-PCE controller 110 may provide a response 134 to computing device 108(1). For example, response 134 may be instructions to route the data traffic via segment route 132(2). As shown in FIG. 1F, computing device 108(1) may then route some or all of the corresponding data traffic 136 via route 132(2) to SP 118(2), and finally to computing device 108(2). Step 8 may also be repeated, in the case of an updated segment route determination for at least a portion of the data traffic. Other scenarios for segment route determination using enhanced segment routing techniques are contemplated. In some implementations, another device may make the initial request for a segment route to the enhanced SR-PCE controller 110. In some examples, enhanced SR-PCE controller 110 may instruct or otherwise cause the computing device 108(1) to simply send the data traffic to a selected exit point, such as BR 106(2), and may provide further information about the segment route 132(2) to the exit point.

To summarize, in enhanced segment routing, business priorities may be included in any or all aspects of the segment routing selection process, including analysis of potential segment routes, ranking of potential segment routes, selection of an exit point from any particular AS 104, selection of intermediary ASs s) through which to route data traffic, and/or selection of any particular individual segment between nodes to include in a segment route. In this manner, clients may be better served by automatically including their own business priorities in segment routing decisions.

Figure 2:
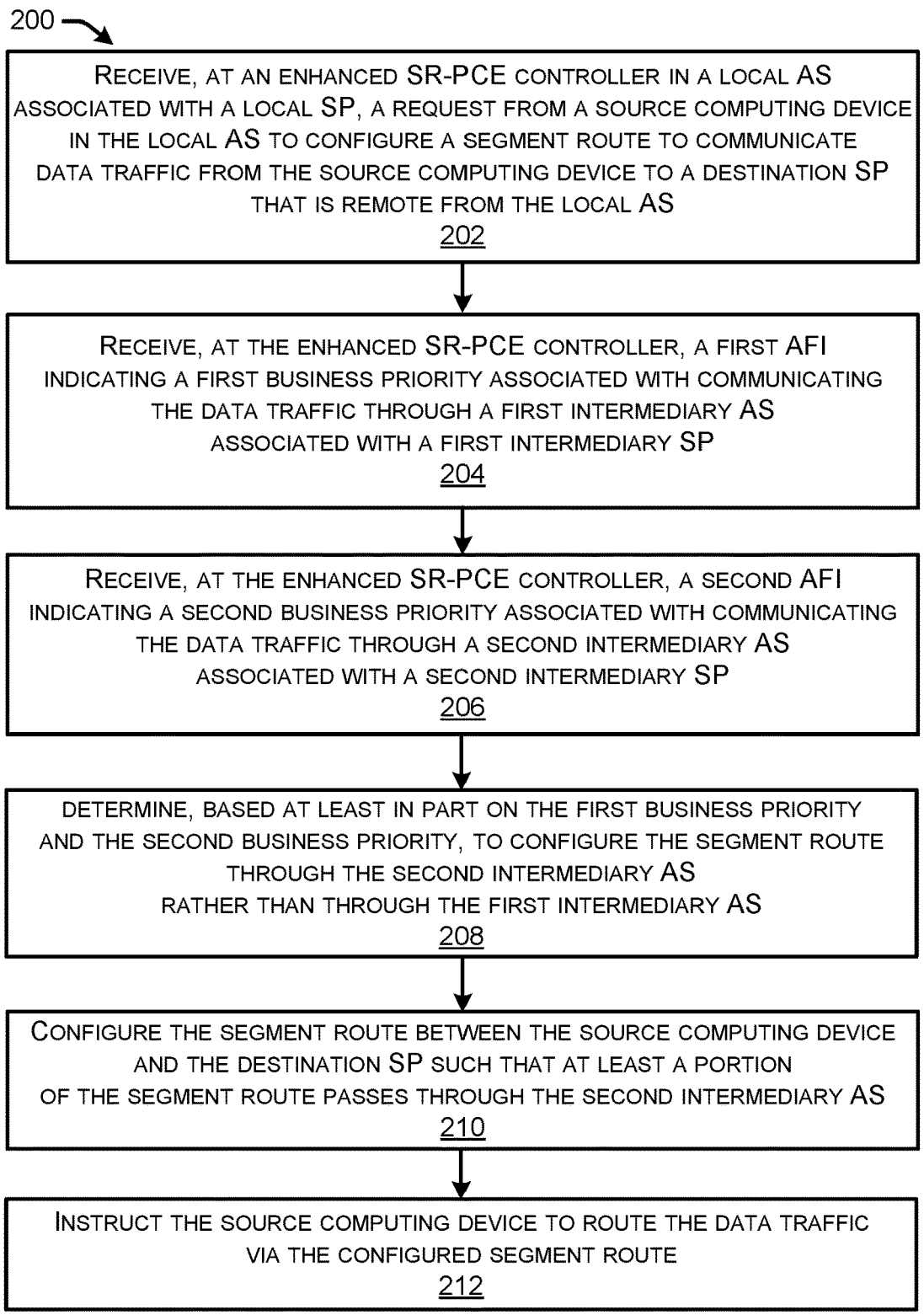
FIGS. 2-4 illustrate flow diagrams of example methods for enhanced segment routing as a part of communications among network devices, in accordance with the present concepts.
Figure 3:
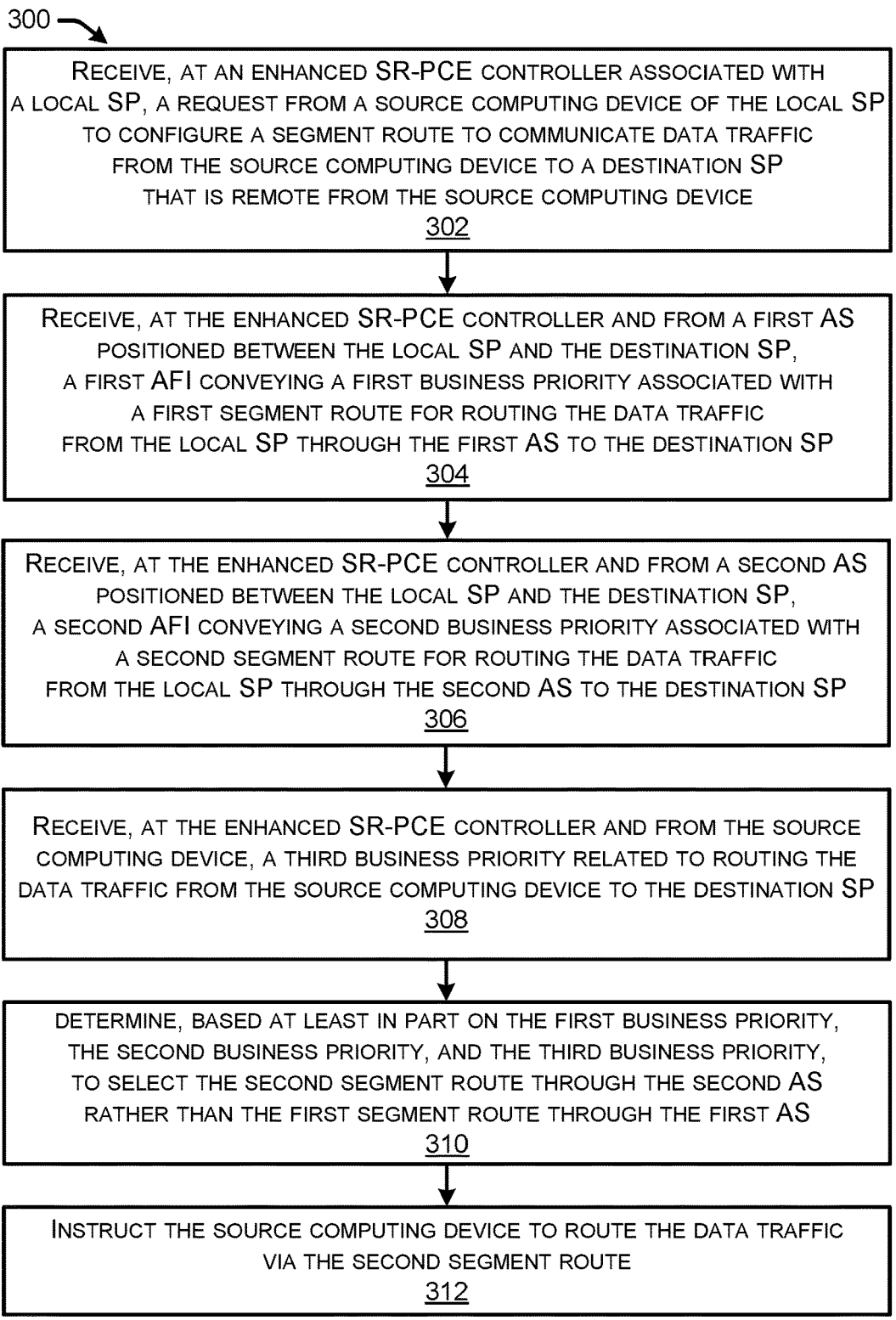
Figure 4:
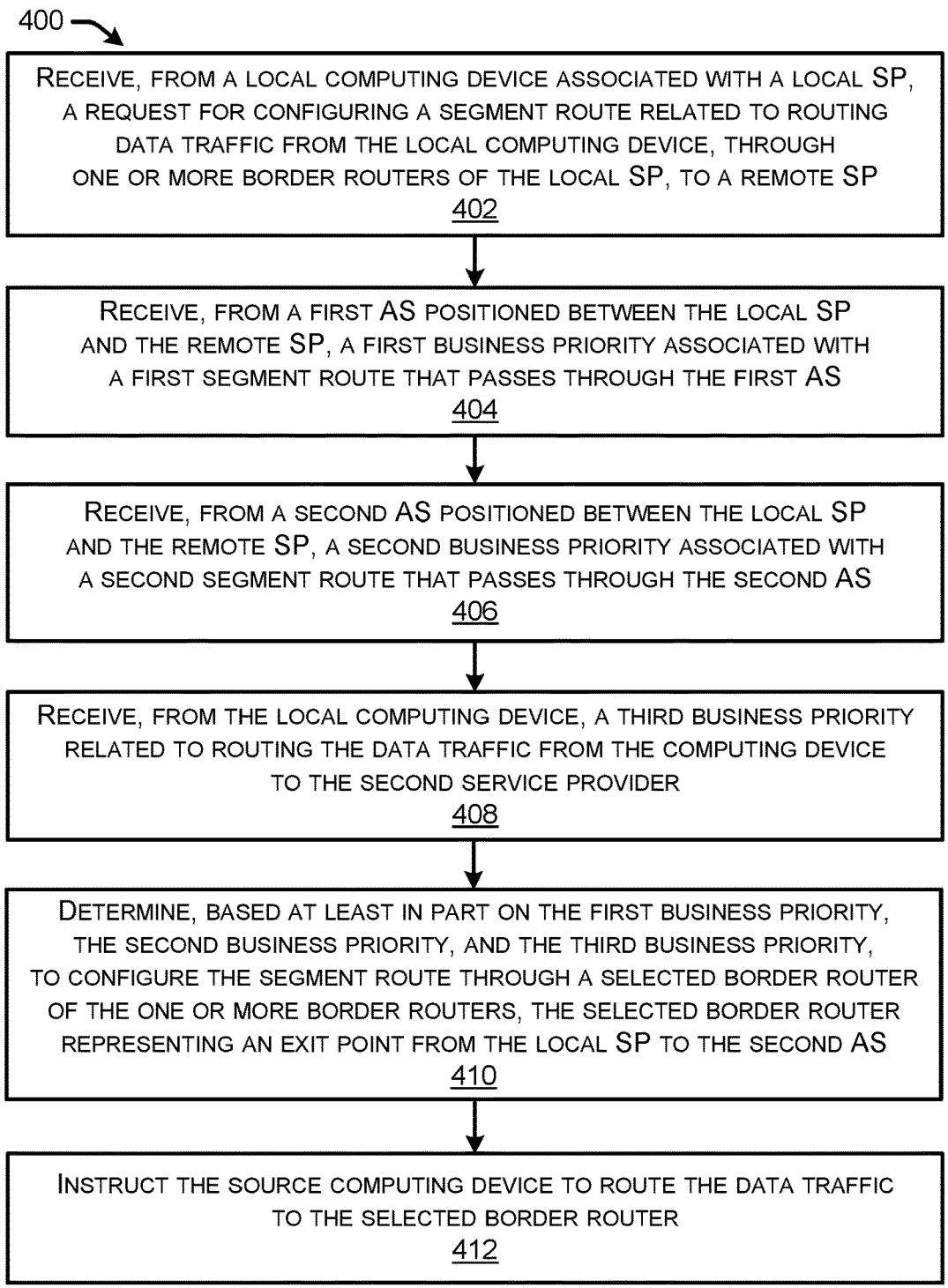

FIGS. 2-4 illustrate flow diagrams of example methods 200, 300, and 400 that include functions that may be performed at least partly by a network device, such as enhanced SR-PCE controller 110, analyzer 112, and/or a BR 106 described relative to FIGS. 1A-1F. The logical operations described herein with respect to FIGS. 2-4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 2-4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 2 illustrates a flow diagram of an example method 200 for network devices to perform enhanced segment routing techniques. Method 200 may be performed by an enhanced SR-PCE controller 110, for instance. In some examples, method 200 may be performed by a computing device comprising one or more processors and one or more non-transitory computer-readable media storing computer-executable instructions that, when executed by the one or more processors, cause the one or more processors to perform method 200.

At 202, method 200 may include receiving, at an enhanced segment routing, path computation element (SR-PCE) controller in a local autonomous system (AS) associated with a local service provider (SP), a request from a source computing device in the local AS to configure a segment route to communicate data traffic from the source computing device to a destination SP that is remote from the local AS.

At 204, method 200 may include receiving, at the enhanced SR-PCE controller, a first address family identifier (AFI) indicating a first business priority associated with communicating the data traffic through a first intermediary AS associated with a first intermediary SP.

At 206, method 200 may include receiving, at the enhanced SR-PCE controller, a second AFI indicating a second business priority associated with communicating the data traffic through a second intermediary AS associated with a second intermediary SP. In one example, the first business priority may comprise a first bandwidth monetary cost for routing the data traffic from the source computing device to the destination SP via the first intermediary SP and the second business priority may comprise a second bandwidth monetary cost for routing the data traffic from the source computing device to the destination SP via the second intermediary SP. In this example, determining to configure the segment route through the second intermediary AS may be based at least in part on the second bandwidth monetary cost being lower than the first bandwidth monetary cost. In another example, method 200 may include assigning a first weight to the first business priority and a second weight to the second business priority. The weights may represent an amount of influence either business priority has on segment route selection, for instance.

At 208, method 200 may include determining, based at least in part on the first business priority and the second business priority, to configure the segment route through the second intermediary AS rather than through the first intermediary AS. In some cases, method 200 may further include sending at least the first business priority and the second business priority to an analyzer for analysis of the first business priority and the second business priority. The analyzer may determine a segment route result. The analyzer may consider weights assigned to any of the business priorities in making a determination of a segment route. The analyzer may also consider additional business priorities related to any intermediary ASs in performing an analysis to determine a segment route. For instance, an example additional business priority may be security threat information related to the first intermediary AS and/or the second intermediary AS. Method 200 may include receiving a segment route result from the analyzer reflecting the analysis. In some examples, determining to configure the segment route through the second intermediary AS may be further based on the segment route result received from the analyzer. A segment route result may also be based on a variety of other factor unrelated to business priorities, such as various network parameters (e.g., a number of hops, routing speed, etc.).

At 210, method 200 may include configuring the segment route between the source computing device and the destination SP such that at least a portion of the segment route passes through the second intermediary AS.

At 212, method 200 may include instructing the source computing device to route the data traffic via the configured segment route.

FIG. 3 illustrates a flow diagram of an example method 300 for network devices to perform enhanced segment routing techniques. Method 200 may be performed by an enhanced SR-PCE controller 110, for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include receiving, at an enhanced segment routing, path computation element (SR-PCE) controller associated with a local service provider (SP), a request from a source computing device of the local SP to configure a segment route to communicate data traffic from the source computing device to a destination SP that is remote from the source computing device.

At 304, method 300 may include receiving, at the enhanced SR-PCE controller and from a first autonomous system (AS) positioned between the local SP and the destination SP, a first address family identifier (AFI) conveying a first business priority associated with a first segment route for routing the data traffic from the local SP through the first AS to the destination SP.

At 306, method 300 may include receiving, at the enhanced SR-PCE controller and from a second AS positioned between the local SP and the destination SP, a second AFI conveying a second business priority associated with a second segment route for routing the data traffic from the local SP through the second AS to the destination SP.

At 308, method 300 may include receiving, at the enhanced SR-PCE controller and from the source computing device, a third business priority related to routing the data traffic from the source computing device to the destination SP. The third business priority may comprise a security priority in some cases.

In some examples, method 300 may further include requesting regulatory information, security threat information, and/or other business priority information from a database. In some examples, the security threat information may relate to one of the intermediary ASs. For instance, the security threat information may specify that a particular AS has had a security breach and/or there is otherwise a threat of data being compromised, lost, and/or stolen if the data are routed through that particular AS. The regulatory information may relate to government or other regulations influencing decisions for data routing through different regions.

At 310, method 300 may include determining, based at least in part on the first business priority, the second business priority, and the third business priority, to select the second segment route through the second AS rather than the first segment route through the first AS. A determination to select the second segment route through the second intermediary AS and/or a certain border router may be further based on received regulatory information, security threat information, and/or other business priorities and/or network parameters.

At 312, method 300 may include instructing the source computing device to route the data traffic via the second segment route.

FIG. 4 illustrates a flow diagram of an example method 400 for network devices to perform enhanced segment routing techniques. Method 200 may be performed by an enhanced SR-PCE controller 110, for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving, from a local computing device associated with a local service provider (SP), a request for configuring a segment route related to routing data traffic from the local computing device, through one or more border routers of the local SP, to a remote SP.

At 404, method 400 may include receiving, from a first autonomous system (AS) positioned between the local SP and the remote SP, a first business priority associated with a first segment route that passes through the first AS.

At 406, method 400 may include receiving, from a second AS positioned between the local SP and the remote SP, a second business priority associated with a second segment route that passes through the second AS.

At 408, method 400 may include receiving, from the local computing device, a third business priority related to routing the data traffic from the computing device to the second service provider. For example, the third business priority may comprise a business preference prioritizing a segment route selection that passes through the second AS rather than the first AS. Stated another way, the local computing device and/or the local SP may have a preference to route the data traffic through the second AS rather than the first AS. For instance, the local SP may have an existing relationship with the second AS related to routing data traffic.

At 410, method 400 may include determining, based at least in part on the first business priority, the second business priority, and the third business priority, to configure the segment route through a selected border router of the one or more border routers, the selected border router representing an exit point from the local SP to the second AS. In some cases, the determination to configure the segment route through the second AS may comprise determining an exit point from the local SP for the data traffic based at least in part on the first business priority, the second business priority, and the third business priority. Furthermore, determining the exit point from the local SP may comprise selecting a particular border router of the local SP as the exit point for the data traffic. The selection of a particular border router may be made from among multiple border routers that have at least one network connection to the second AS, for instance.

At 412, method 400 may include instructing the source computing device to route the data traffic to the selected border router.

Figure 5:
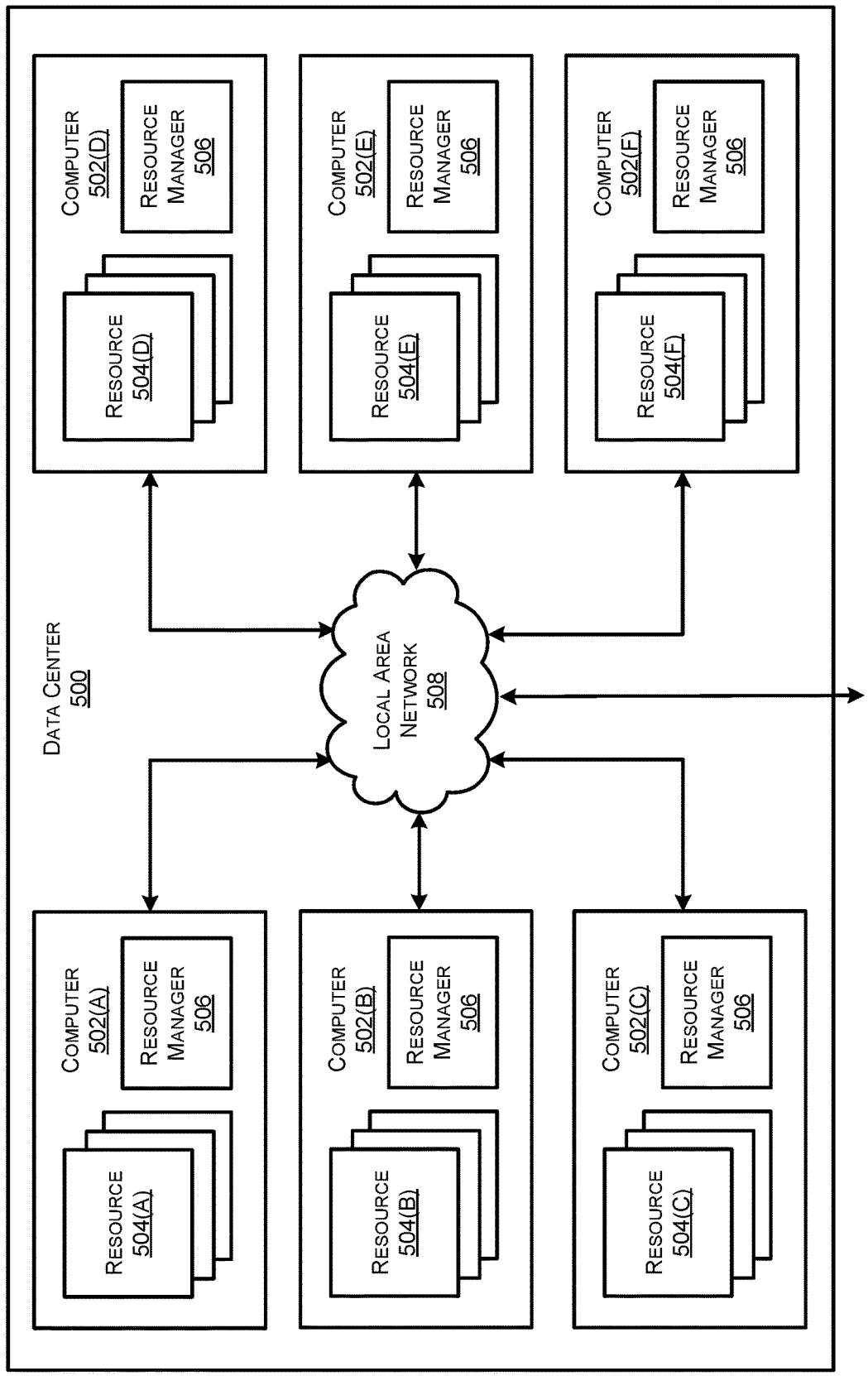
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the resources and/or computers 502 may include, or correspond to, any type of networked device described herein, such as a BR 106, computing device 108, enhanced SR-PCE controller 110, analyzer 112, and/or database 114 for instance. Although, computers 502 may comprise any type of networked device, such as servers, switches, routers, hubs, bridges, gateways, modems, repeaters, access points, hosts, etc.

The computers 502 can be standard tower, rack-mount, or blade server computers configured appropriately for providing computing resources. In some examples, the computers 502 may provide computing resources 504 including data processing resources such as virtual machine (VM) instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502.

Computers 502 in the data center 500 can also be configured to provide network services and other types of services.

In the example data center 500 shown in FIG. 5, an appropriate local area network (LAN) 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein. For instance, the containers and/or virtual machines may serve as server devices, user devices, and/or routers in the network 102.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
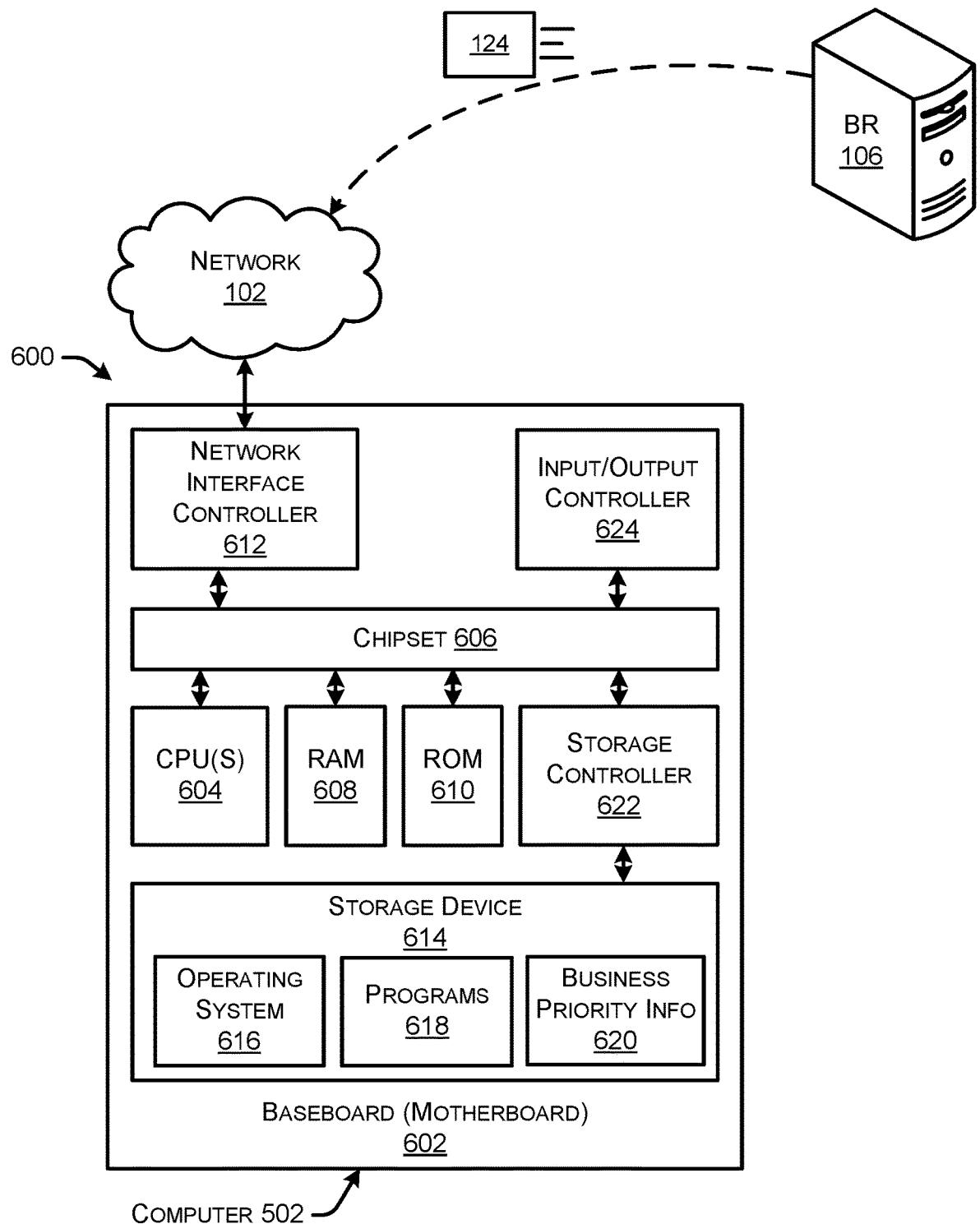
FIG. 6 is a computer architecture diagram showing an illustrative computer hardware architecture for implementing a device that can be utilized to implement aspects of the various technologies presented herein.

FIG. 6 shows an example computer architecture 600 for a computer 502 capable of executing program components for implementing the functionality described above. The computer architecture 600 shown in FIG. 6 illustrates a conventional server computer, workstation, desktop computer, laptop, tablet, network appliance, e-reader, smartphone, and/or other computing device, and can be utilized to execute any of the software components presented herein. The computer 502 may, in some examples, correspond to a physical device described herein (e.g., border router, controller, analytics engine, etc.), and may comprise networked devices such as servers, switches, routers, hubs, bridges, gateways, modems, repeaters, access points, etc. For instance, computer 502 may correspond to enhanced SR-PCE controller 110.

As shown in FIG. 6, the computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as the network 102. The chipset 606 can include functionality for providing network connectivity through a network interface controller (NIC) 612, such as a gigabit Ethernet adapter. The NIC 612 is capable of connecting the computer 502 to other computing devices over the network 102. For instance, in the example shown in FIG. 6, NIC 612 may help facilitate transfer of data, packets, and/or communications, such as receiving business priority information 124, over the network 102 with other devices, such as a BR 106. It should be appreciated that multiple NICs 612 can be present in the computer 502, connecting the computer to other types of networks and remote computer systems.

The computer 502 can be connected to a storage device 614 that provides non-volatile storage for the computer. The storage device 614 can store an operating system 616, programs 618, business priority information 620, and/or other data. The storage device 614 can be connected to the computer 502 through a storage controller 622 connected to the chipset 606, for example. The storage device 614 can consist of one or more physical storage units. The storage controller 622 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 614 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 614 is characterized as primary or secondary storage, and the like.

For example, the computer 502 can store information to the storage device 614 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 614 by detecting the physical states or characteristics of one or more particular locations within the physical storage units.

In addition to the mass storage device 614 described above, the computer 502 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 502. In some examples, the operations performed by the network 102, and or any components included therein, may be supported by one or more devices similar to computer 502. Stated otherwise, some or all of the operations performed by the network 102, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 614 can store an operating system 616 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 614 can store other system or application programs and data utilized by the computer 502.

In one embodiment, the storage device 614 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 402 has access to computer-readable storage media storing computer-executable instructions which, when executed by the computer 502, perform the various processes described above with regard to FIGS. 1A-4. The computer 502 can also include computer-readable storage media having instructions stored thereupon for performing any of the other computer-implemented operations described herein.

The computer 502 can also include one or more input/output controllers 624 for receiving and processing input from a number of input devices, such as a keyboard, a mouse, a touchpad, a touch screen, an electronic stylus, or other type of input device. Similarly, an input/output controller 624 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise one or more devices, such as BRs 106, computing devices 108, enhanced SR-PCE controller 110, analyzer 112, database 114, and/or other devices. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by BRs 106, computing devices 108, enhanced SR-PCE controller 110, analyzer 112, and/or database 114, and/or other devices. In some examples, the communications may include data, packet, request, business priority information, segment route results, instructions, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 618 may comprise any type of programs or processes to perform the techniques described in this disclosure in accordance with enhanced segment routing techniques. For instance, the programs 618 may cause the computer 502 to perform techniques for communicating with other devices using any type of protocol or standard usable for determining connectivity. Additionally, the programs 618 may comprise instructions that cause the computer 502 to perform the specific techniques for determination of segment routing with consideration for business priorities.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
    receiving, at an enhanced segment routing, path computation element (SR-PCE) controller in a local autonomous system (AS) associated with a local service provider (SP), a request from a source computing device in the local AS to configure a segment route to communicate data traffic from the source computing device to a destination SP that is remote from the local AS;
    receiving, at the enhanced SR-PCE controller, a first address family identifier (AFI) indicating a first business priority associated with communicating the data traffic through a first intermediary AS associated with a first intermediary SP;
    receiving, at the enhanced SR-PCE controller, a second AFI indicating a second business priority associated with communicating the data traffic through a second intermediary AS associated with a second intermediary SP;
    determining, based at least in part on the first business priority and the second business priority, to configure the segment route through the second intermediary AS rather than through the first intermediary AS;
    configuring the segment route between the source computing device and the destination SP such that at least a portion of the segment route passes through the second intermediary AS; and
    instructing the source computing device to route the data traffic via the configured segment route;
    wherein the first business priority comprises a first bandwidth monetary cost for routing the data traffic from the source computing device to the destination SP via the first intermediary SP and the second business priority comprises a second bandwidth monetary cost for routing the data traffic from the source computing device to the destination SP via the second intermediary SP.

2. The computer-implemented method of claim 1, wherein the determining to configure the segment route through the second intermediary AS is based at least in part on weighting the first business priority and the second business priority.

3. The computer-implemented method of claim 1, wherein the determining to configure the segment route through the second intermediary AS is based at least in part on the second bandwidth monetary cost being lower than the first bandwidth monetary cost.

4. The computer-implemented method of claim 1, further comprising:
    sending at least the first business priority and the second business priority to an analyzer for analysis of the first business priority and the second business priority with at least one additional business priority related to each of the first intermediary AS and the second intermediary AS; and
    receiving a segment route result from the analyzer reflecting the analysis,
    wherein the determining to configure the segment route through the second intermediary AS is further based on the segment route result received from the analyzer.

5. The computer-implemented method of claim 4, wherein the at least one additional business priority represents security threat information related to the first intermediary AS and the second intermediary AS.

6. The computer-implemented method of claim 1, further comprising:
    assigning a first weight to the first business priority and a second weight to the second business priority, the first weight and the second weight representing an amount of influence on a determination of the segment route,
    wherein the second weight is greater than the first weight.

7. The computer-implemented method of claim 1, further comprising:
    receiving, from the source computing device, a third business priority related to routing the data traffic from the source computing device to the destination SP,
    wherein the third business priority comprises a security priority.

8. The computer-implemented method of claim 7, wherein the third business priority is associated with a weighting factor that assigns a greater weight to routing the data traffic through the second intermediary AS than through the first intermediary AS.

9. The computer-implemented method of claim 1, further comprising:
    receiving security threat information from a database,
    wherein the determining to configure the segment route through the second intermediary AS is further based on the security threat information.

10. The computer-implemented method of claim 9, wherein the security threat information relates to the first intermediary AS.

11. A computer-implemented method comprising:
    receiving, at an enhanced segment routing, path computation element (SR-PCE) controller associated with a local service provider (SP), a request from a source computing device of the local SP to configure a segment route to communicate data traffic from the source computing device to a destination SP that is remote from the source computing device;
    receiving, at the enhanced SR-PCE controller and from a first autonomous system (AS) positioned between the local SP and the destination SP, a first address family identifier (AFI) conveying a first business priority associated with a first segment route for routing the data traffic from the local SP through the first AS to the destination SP;
    receiving, at the enhanced SR-PCE controller and from a second AS positioned between the local SP and the destination SP, a second AFI conveying a second business priority associated with a second segment route for routing the data traffic from the local SP through the second AS to the destination SP;

receiving, at the enhanced SR-PCE controller and from the source computing device, a third business priority related to routing the data traffic from the source computing device to the destination SP;

determining, based at least in part on the first business priority, the second business priority, and the third business priority, to select the second segment route through the second AS rather than the first segment route through the first AS; and instructing the source computing device to route the data traffic via the second segment route, wherein the third business priority comprises at least one of:
  a security factor;
  a regulatory factor; or
  a load sharing ratio.

12. The computer-implemented method of claim 11, wherein the determining to select the second segment route through the second AS is based at least in part on weighting the first business priority, the second business priority, and the third business priority.

13. The computer-implemented method of claim 11, wherein the third business priority is associated with a weighting factor that assigns a greater weight to configuring the segment route through the second AS than through the first AS.

14. The computer-implemented method of claim 13, wherein the determining to select the second segment route through the second AS is further based on the greater weight for making a segment route selection through the second AS than through the first AS.

15. The computer-implemented method of claim 11, wherein the determining to select the second segment route through the second AS further comprises determining an exit point from the local SP for the data traffic based at least in part on the first business priority, the second business priority, and the third business priority.

16. The computer-implemented method of claim 15, wherein the determining the exit point from the local SP further comprises selecting a particular border router of the local SP as the exit point for the data traffic from among multiple border routers that have at least one network connection to the second AS.

17. A controller device comprising:
one or more processors; and
one or more non-transitory computer-readable media storing computer-executable instructions that, when executed by the one or more processors, cause the one or more processors to:

receive, from a local computing device associated with a local service provider (SP), a request for configuring a segment route related to routing data traffic from the local computing device, through one or more border routers of the local SP, to a remote SP;

receive, from a first autonomous system (AS) positioned between the local SP and the remote SP, a first business priority associated with a first segment route that passes through the first AS;

receive, from a second AS positioned between the local SP and the remote SP, a second business priority associated with a second segment route that passes through the second AS;

receive, from the local computing device, a third business priority related to routing the data traffic from the local computing device to the remote SP;

prioritize, based at least in part on the first business priority, the second business priority, and the third business priority, configuration of the segment route through a selected border router of the one or more border routers, the selected border router representing an exit point from the local SP to the second AS; and instruct the local computing device to route the data traffic to the selected border router.

18. The controller device of claim 17, wherein the first business priority comprises a first bandwidth monetary cost for routing the data traffic via the first segment route and the second business priority comprises a second bandwidth monetary cost for routing the data traffic via the second segment route, and the second bandwidth monetary cost is lower than the first bandwidth monetary cost.

19. The controller device of claim 17, wherein the third business priority comprises a business preference prioritizing a segment route selection that passes through the second AS rather than the first AS.

20. The controller device of claim 17, wherein the computer-executable instructions, when executed by the one or more processors, further cause the one or more processors to:

request regulatory information from a database;

receive the regulatory information; and determine to configure the segment route through the selected border router based at least in part on the regulatory information.

* * * * *